(12) United States Patent
Quayle

(10) Patent No.: US 6,942,182 B2
(45) Date of Patent: Sep. 13, 2005

(54) FORWARD INBOARD RETRACTING MAIN LANDING GEAR

(75) Inventor: Brian Quayle, Lancaster, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 59 days.

(21) Appl. No.: 10/437,679

(22) Filed: May 13, 2003

(65) Prior Publication Data
US 2005/0178900 A1 Aug. 18, 2005

(51) Int. Cl.$^7$ .................................................. B64C 25/01
(52) U.S. Cl. ................................................ 244/102 R
(58) Field of Search ........................ 244/102 R, 100 R, 244/101, 102 A, 102 SL, 102 SS

(56) References Cited

U.S. PATENT DOCUMENTS

| | | | |
|---|---|---|---|
| 3,511,456 A * | 5/1970 | Fehring et al. | 244/102 R |
| 4,155,522 A * | 5/1979 | Sealey | 244/102 R |
| 4,720,063 A * | 1/1988 | James et al. | 244/102 R |
| 5,000,400 A * | 3/1991 | Stuhr | 244/102 R |
| 5,086,995 A * | 2/1992 | Large | 244/102 R |
| 5,263,664 A * | 11/1993 | Derrien et al. | 244/102 R |
| 5,269,481 A * | 12/1993 | Derrien | 244/102 R |
| 5,482,228 A | 1/1996 | Hoshino | |
| 5,692,703 A | 12/1997 | Murphy et al. | |
| 5,875,994 A * | 3/1999 | McCrory | 244/102 A |
| 6,273,364 B1 | 8/2001 | Tizac et al. | |
| 6,279,853 B1 | 8/2001 | Brighton | |
| 6,345,787 B1 * | 2/2002 | Tighe et al. | 244/102 R |
| 6,360,990 B1 * | 3/2002 | Grossman | 244/102 R |
| 6,464,168 B1 * | 10/2002 | Swannell et al. | 244/102 A |
| 6,481,668 B2 | 11/2002 | Grossman | |

* cited by examiner

Primary Examiner—Teri Pham Luu
Assistant Examiner—Stephen A Holzen
(74) Attorney, Agent, or Firm—Ken J. Koestner; Koestner Bertani LLP

(57) ABSTRACT

An aircraft landing gear is movable between a retracted position and an extended position. The aircraft landing gear comprises a nonfolding, nonhinged shock strut that extends along a shock strut axis from a proximal end to a distal end and remains at an essentially constant length throughout an extension/retraction cycle. A trunnion is coupled to the proximal end of the shock strut and capable of pivoting in combination with the shock strut about a canted trunnion axis. A multiple-wheel truck is coupled to the distal end of the shock strut. A drag strut is coupled to the shock strut at a position intermediate to the shock strut proximal and distal end and is capable of folding as the landing gear is retracted and straightening as the landing gear is extended. The canted trunnion axis is canted so that the shock strut retracts in a forward and inboard direction and extends downward and outboard.

25 Claims, 10 Drawing Sheets

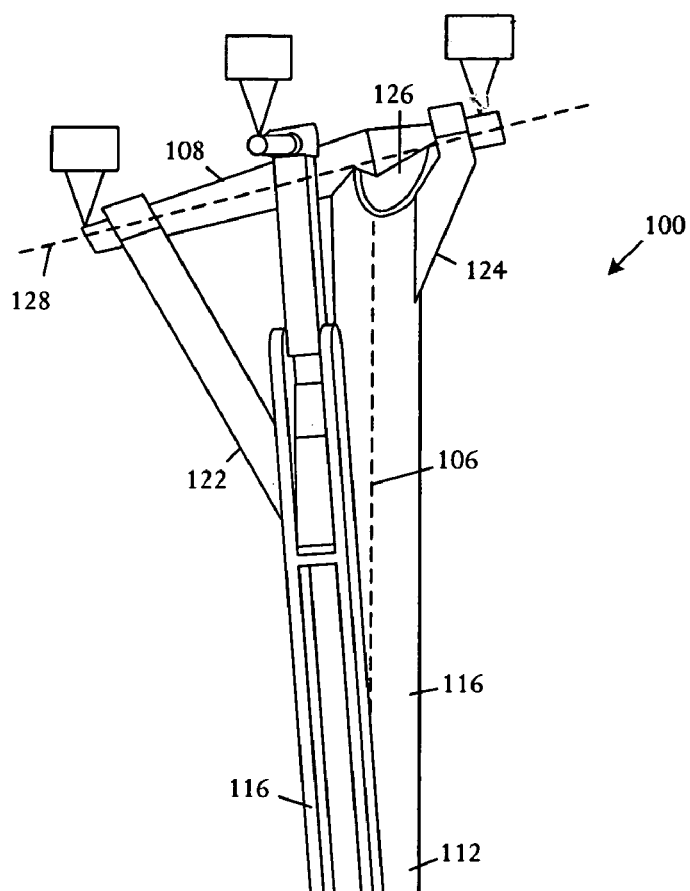
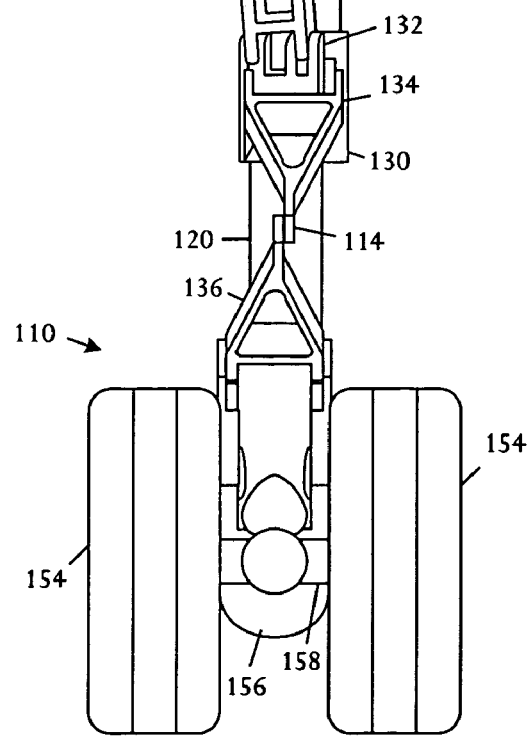
FIG. 1A

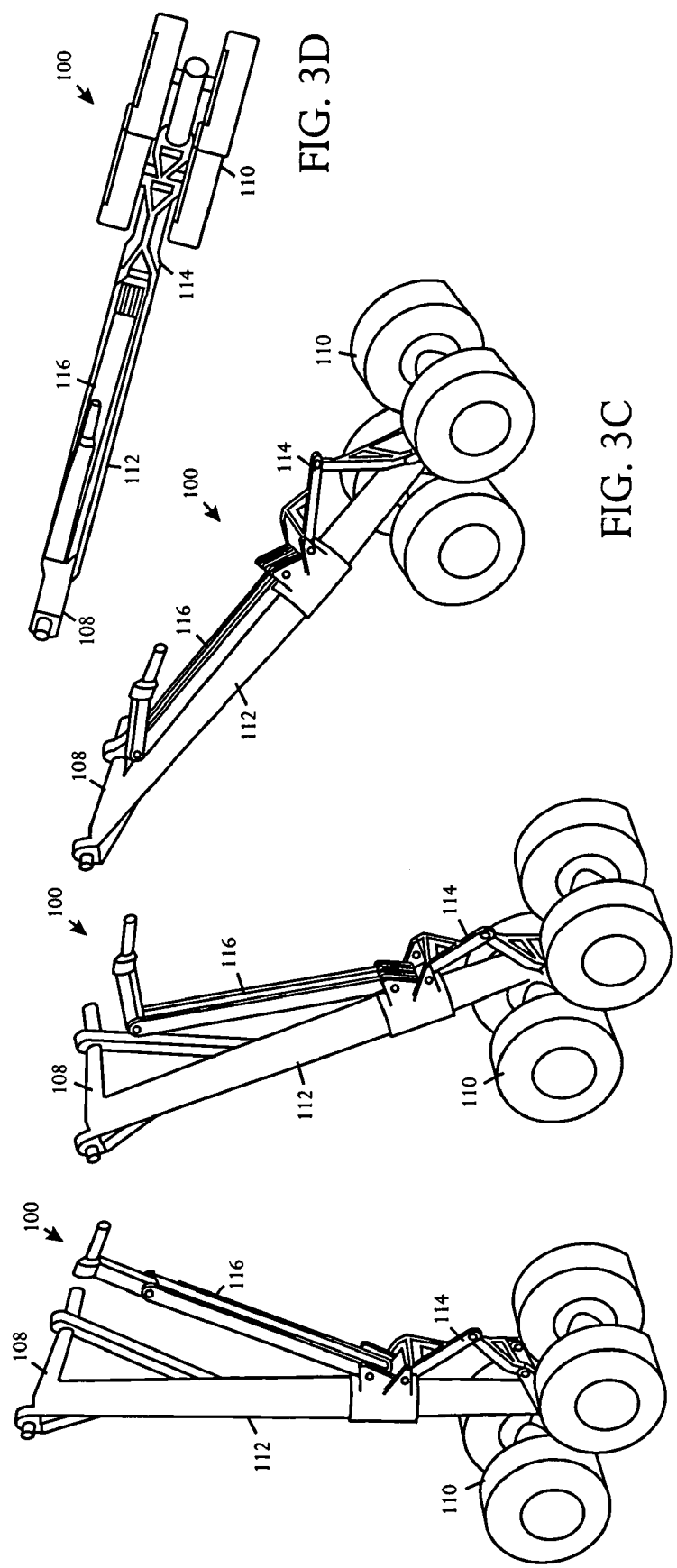

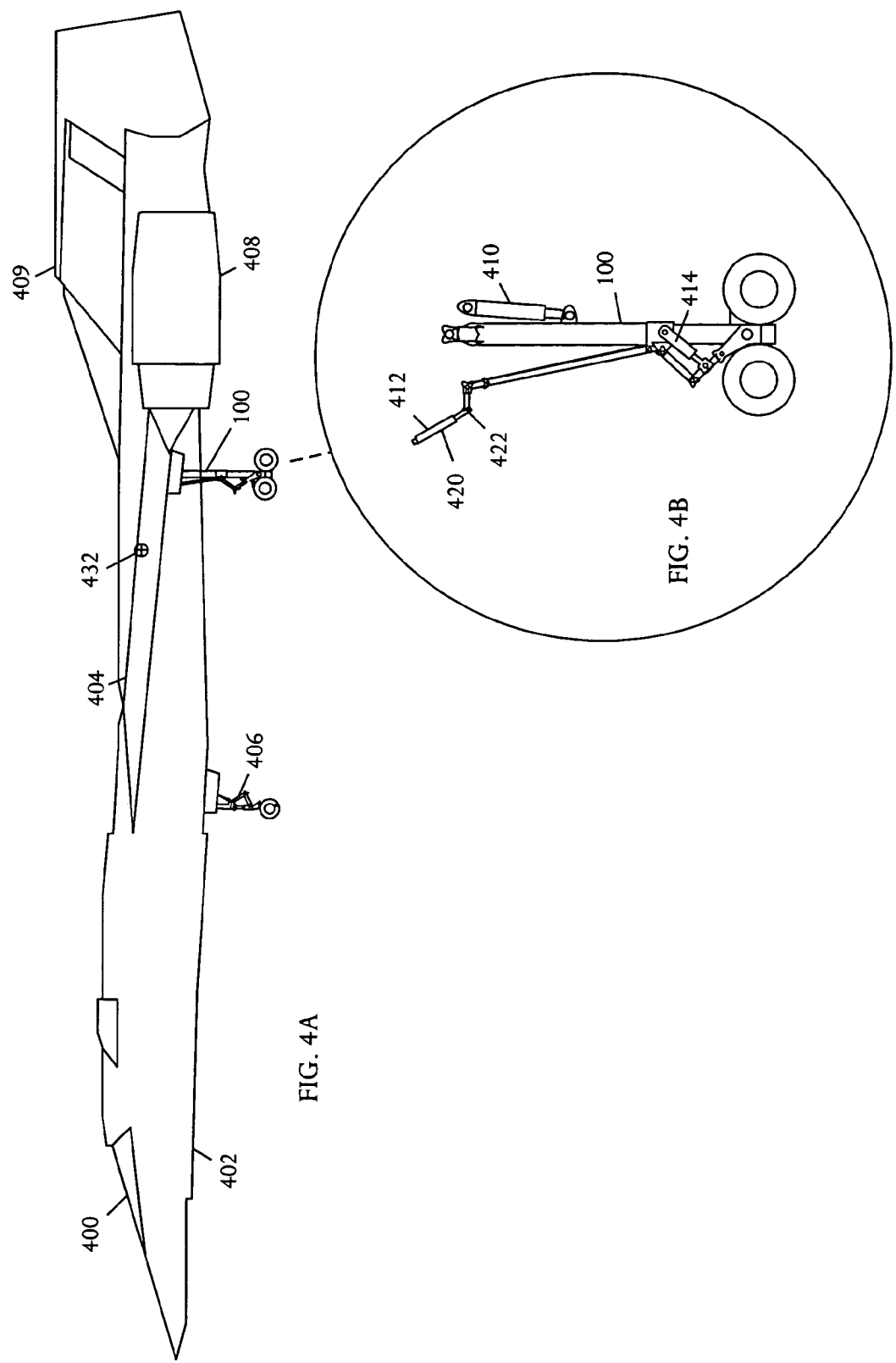

FORWARD INBOARD RETRACTING MAIN LANDING GEAR

BACKGROUND OF THE INVENTION

Characteristics of aircraft structure and usage, including geometry, weight, and purpose determine appropriate structural, kinematic, and positioning characteristics of landing gear. Landing gear positioning is fundamentally based on stability considerations during high-stress operations including landing, takeoff and taxiing, when the aircraft should avoid tip back or tip over. Kinematics relates to behavior of landing gear elements that are used to retract and extend the landing gear. Landing gear kinematics largely concern geometry of landing gear in deployed and retracted positions, in combination with the swept volume consumed during retraction and deployment.

Landing gear design for modern aircraft takes into consideration load distribution, stowage space, stowage proximity, and gear kinematic capability to transfer the gear between stowed and deployed positions. Main landing gear are commonly wing-mounted and body-stowed. Heavy aircraft gross weights demand additional or more durable gear posts and tires to meet reasonable load distribution standards. Increasing wing sweep further complicates landing gear design by reducing space available to stow the gear and complicating gear form and structure.

Some landing gear designs have used joints or bends to "jack knife" a landing gear strut to fit the gear into longitudinally shorter stowage space. The result can be a net space increase in the size of the stowed gear to accommodate linkages to deploy the gear, bend the joints, and lock the braces while maintaining the strut in a fully-extended position.

Some aircraft, for example, passenger transport aircraft, often employ a nose wheel tricycle landing gear configuration that results in a nearly level fuselage and cabin floor when the aircraft is on the ground. The nose wheel tricycle configuration also improves stability during braking and ground maneuvering. During landing, the location of the main landing gear relative to the aircraft center of gravity produces a nose-down pitching moment on touchdown, reducing the aircraft angle of attack and the wing-generated lift. Braking forces acting behind the aircraft center of gravity stabilize the aircraft and enable full brake usage, reducing the landing field length.

One challenge in design and implementation of a nose wheel tricycle landing gear configuration relates to storage of the gear when retracted. Some aircraft, for example the Concorde, use main landing gear that shorten during the retraction process because the gear would otherwise be too long to fit into storage bays. A disadvantage of the shortening gear is the introduction of folding linkages and hinges as points of failure. Reliability concerns mandate the avoidance or elimination of points of failure.

SUMMARY OF THE INVENTION

What is desired is a landing gear that reduces the amount of storage volume while avoiding interference between the landing gear and surrounding structures. What is further desired is a simple landing gear that avoids points of failure associated with shortening structures of the main landing gear strut such as folding and hinge structures.

In accordance with various embodiments of the disclosed aircraft landing system, a main landing gear comprises a continuous linear strut, unbroken by bends or folds that is connected to an aircraft wing and stows forward and inward so that the landing gear truck is compactly contained within the aircraft fuselage. The continuous linear strut eliminates folds and hinges in the support structure that otherwise increase complexity, cost, and maintenance burden. Avoidance of hinges and bends in the support beam also reduces or minimizes the likelihood of strut breakage and failure that may prevent the gear from extending. Forward and inward stowing of the landing gear reduces lateral sweep of the gear when retracted so that landing gear on both sides of the aircraft do not interfere upon retraction, even for long landing gear.

In accordance with some embodiments of the illustrative system, an aircraft landing gear is movable between a retracted position and an extended position. The aircraft landing gear comprises a nonfolding, nonhinged shock strut that extends along a shock strut axis from a proximal end to a distal end and remains at an essentially constant length throughout an extension/retraction cycle. A trunnion is coupled to the proximal end of the shock strut and capable of pivoting in combination with the shock strut about a canted trunnion axis. A multiple-wheel truck is coupled to the distal end of the shock strut. A drag strut is coupled to the shock strut at a position intermediate to the shock strut proximal and distal end and is capable of folding as the landing gear is retracted and straightening as the landing gear is extended. The canted trunnion axis is canted so that the shock strut retracts in a forward and inboard direction and extends downward and outboard.

In accordance with another embodiment, an aircraft landing gear apparatus is used in an aircraft including a fuselage extending fore and aft and wings attached at an inboard location to the fuselage. The landing gear apparatus comprises a landing gear storage compartment formed under the wing, beginning at a landing gear linkage and extending forward an inboard to a wheel well under the fuselage, and a landing gear. The landing gear is movable between a retracted position and an extended position and comprises a nonfolding, nonhinged shock strut and a multiple-wheel truck. The shock strut is coupled to the landing gear linkage at a proximal end and extends along a shock strut axis from the proximal end to a distal end. The shock strut has an essentially constant length throughout an extension/retraction cycle. The multiple-wheel truck coupled to the distal end of the shock strut. The landing gear has a geometry that angles the shock strut distal end and the truck in a forward and inboard direction during retraction, stowing the multiple-wheel truck in the fuselage wheel well.

In accordance with a further embodiment, an aircraft comprises a fuselage, paired wings coupled to opposing sides of the fuselage, at least two engines mounted on the paired wings symmetrically with respect to the fuselage, and a landing gear apparatus. The landing gear apparatus comprises paired landing gear storage compartments and landing gear. The paired landing gear storage compartments are respectively formed under the paired wings forward and inward toward the fuselage from the engines, each beginning at a landing gear linkage and extending forward an inboard to a wheel well under the fuselage. Each landing gear is movable between a retracted position and an extended position and comprises a nonfolding, nonhinged shock strut and a multiple-wheel truck coupled to the distal end of the shock strut. The shock strut is coupled to the landing gear linkage at a proximal end and extending along a shock strut axis from the proximal end to a distal end. The shock strut has an essentially constant length throughout an extension/retraction cycle. The landing gear has a geometry that angles the shock strut distal end and the truck in a forward and inward direction during retraction, stowing the multiple-wheel truck in the fuselage wheel well.

In other embodiments, an aircraft comprises a fuselage, paired wings coupled to opposing sides of the fuselage and having a leading edge and a trailing edge, and at least two engines mounted on the paired wings symmetrically with respect to the fuselage. The wings incorporate a substantial dihedral inboard toward the fuselage from the engines with the dihedral being most pronounced at the wing trailing edge. The aircraft further comprises paired landing gear storage compartments respectively formed under the paired wings forward and inboard toward the fuselage from the engines and paired landing gear. Each landing gear comprises a nonfolding, nonhinged shock strut and a multiple wheel truck coupled to the shock strut arranged in a geometry so that the landing gear retract forward and inward into the landing gear storage compartment with the multiple wheel truck being stowed in the compartment in a fore and aft arrangement.

In an illustrative embodiment, a four-wheel truck arrangement reduces wheel and tire size and spreads truck volume over an extended length to reduce stowage cross-sectional area. The reduction is cross-sectional area of the truck arrangement can be exploited to attain a low wave drag and to produce a desirable sonic boom signature, improving environmental aspects of aircraft performance. The landing gear also enables or facilitates a relatively forward position of gear stowage volume and thus a reduction in fuselage volume behind the landing gear, characteristics that also improve wave drag and sonic boom reduction considerations.

The forward retraction aspect of the landing gear is highly desirable in an aircraft configured so that the landing gear length from trunnion to axle in an uncompressed position is longer than the available distance from the trunnion to the vehicle centerline for stowing the landing gear directly inboard. In various embodiments, the identified configuration can be useful for attaining aerodynamic and sonic boom suppression goals. The continuous, nonbending, and nonfolding aspects of the forward retracting main landing gear are further desirable to avoid or eliminate weight, reduce cost, simplify maintenance procedures, and increase reliability. Forward retraction and storage of the landing gear, thereby avoiding direct inboard stowing, reduces or eliminates additional folding mechanisms and or shrink links. Avoidance of shrink links is desirable to avoid shrink link failure in the retracted position that could jam a wheel truck and prevent gear extension.

The drag strut and collar structure and controlled truck positioning aspects used in some embodiments of the landing gear enable or facilitate fore-aft oriented stowage that can attain desirable stowage volume characteristics.

In various embodiments, an aspect of an aircraft that utilizes the disclosed main landing gear is a substantial dihedral or gulling incorporated into the wing inboard of the engines, most pronounced at the wing trailing edge. The dihedral or gulling is created by twisting or cambering the wing for low sonic boom and low induced drag while preserving a tailored local wing contour where the main landing gear retracts. In some embodiments, the wing includes leading edge Krueger flaps with the leading edge of the wing extending in an essentially straight line to facilitate using a simple hinge line that accommodates Krueger flaps along approximately the full-span of the wing.

Another distinctive characteristic of some disclosed embodiments is the integration of wing, nacelle, and diverter to follow the contour of a low-sonic-boom fuselage with as close a normal intersection as possible to attain a low interference drag. Some embodiments have an inboard flap hinge line that is fully contained within the wing contour with the wing upper and lower surfaces held as planar as is possible to facilitate seal design.

BRIEF DESCRIPTION OF THE DRAWINGS

Embodiments of the invention relating to both structure and method of operation, may best be understood by referring to the following description and accompanying drawings.

FIGS. 1A, 1B, and 1C are schematic pictorial diagrams showing front, side, and top views of an extended main landing gear.

FIGS. 3A, 3B, 3C, and 3D are a sequence of pictorial diagrams showing the main landing gear an extended configuration, transitional configurations, and a retracted configuration.

FIGS. 4A and 4B are schematic pictorial diagrams respectively depicting side views of an example of an aircraft that includes the main landing gear, and the landing gear shown separately.

DETAILED DESCRIPTION OF THE EMBODIMENTS

Figure 1B:
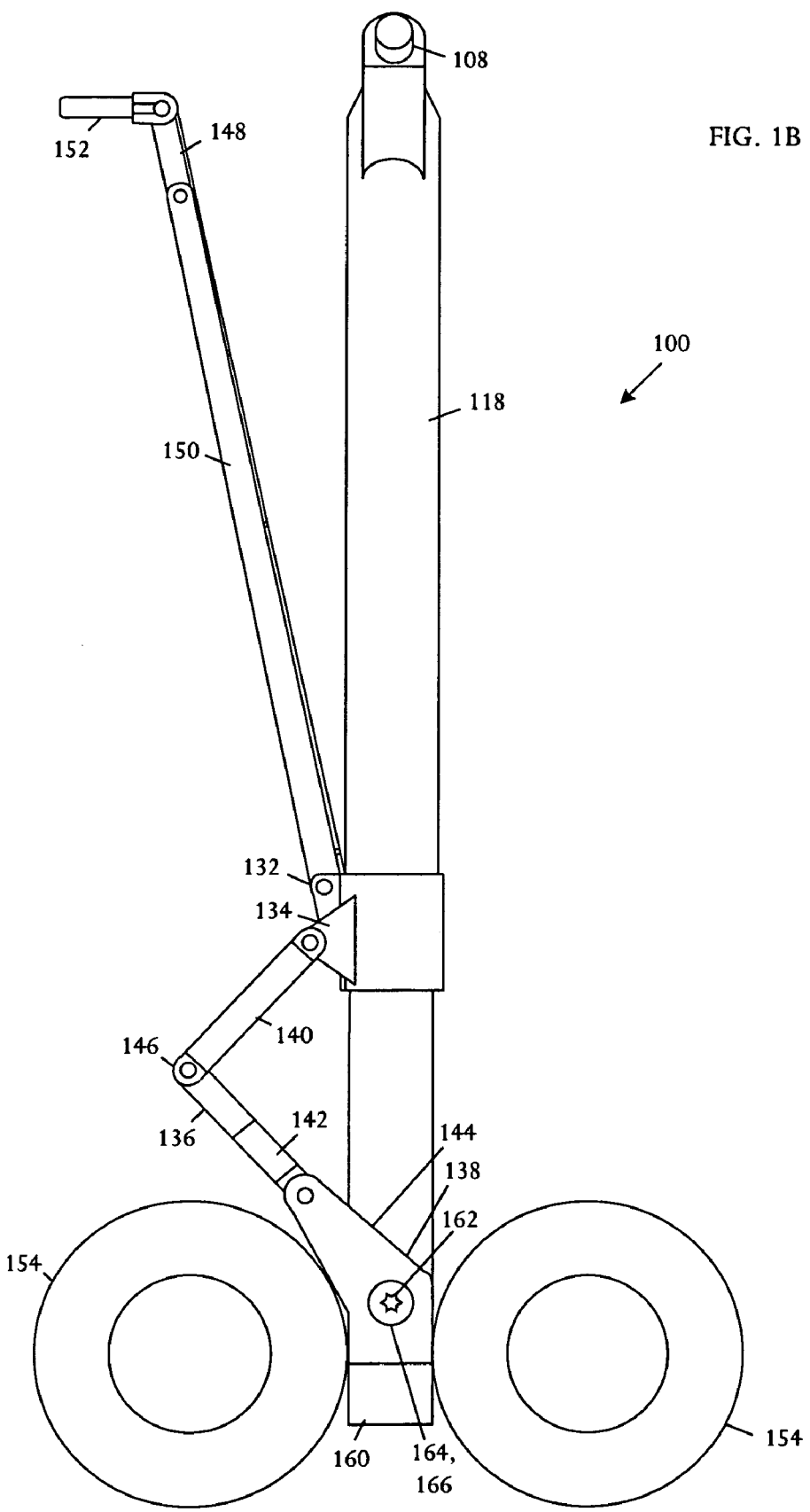
Figure 1C:
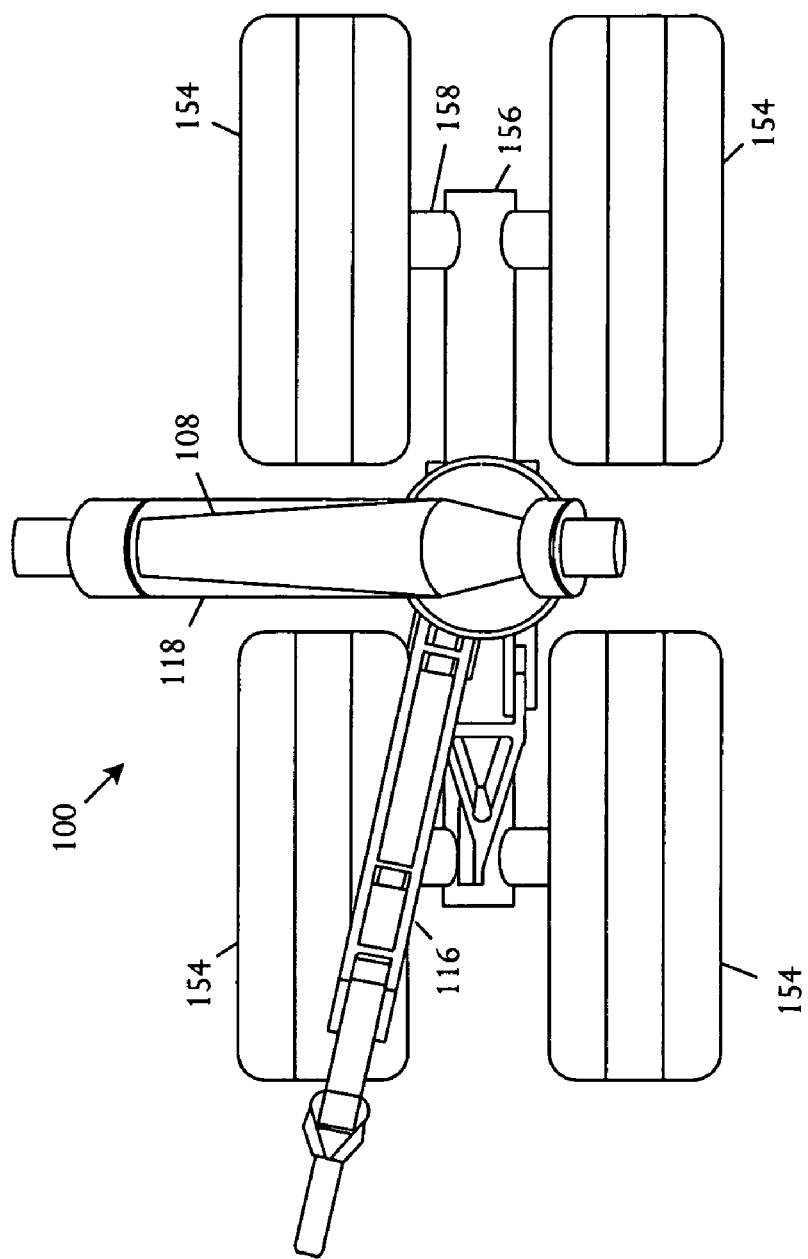
Figure 2A:
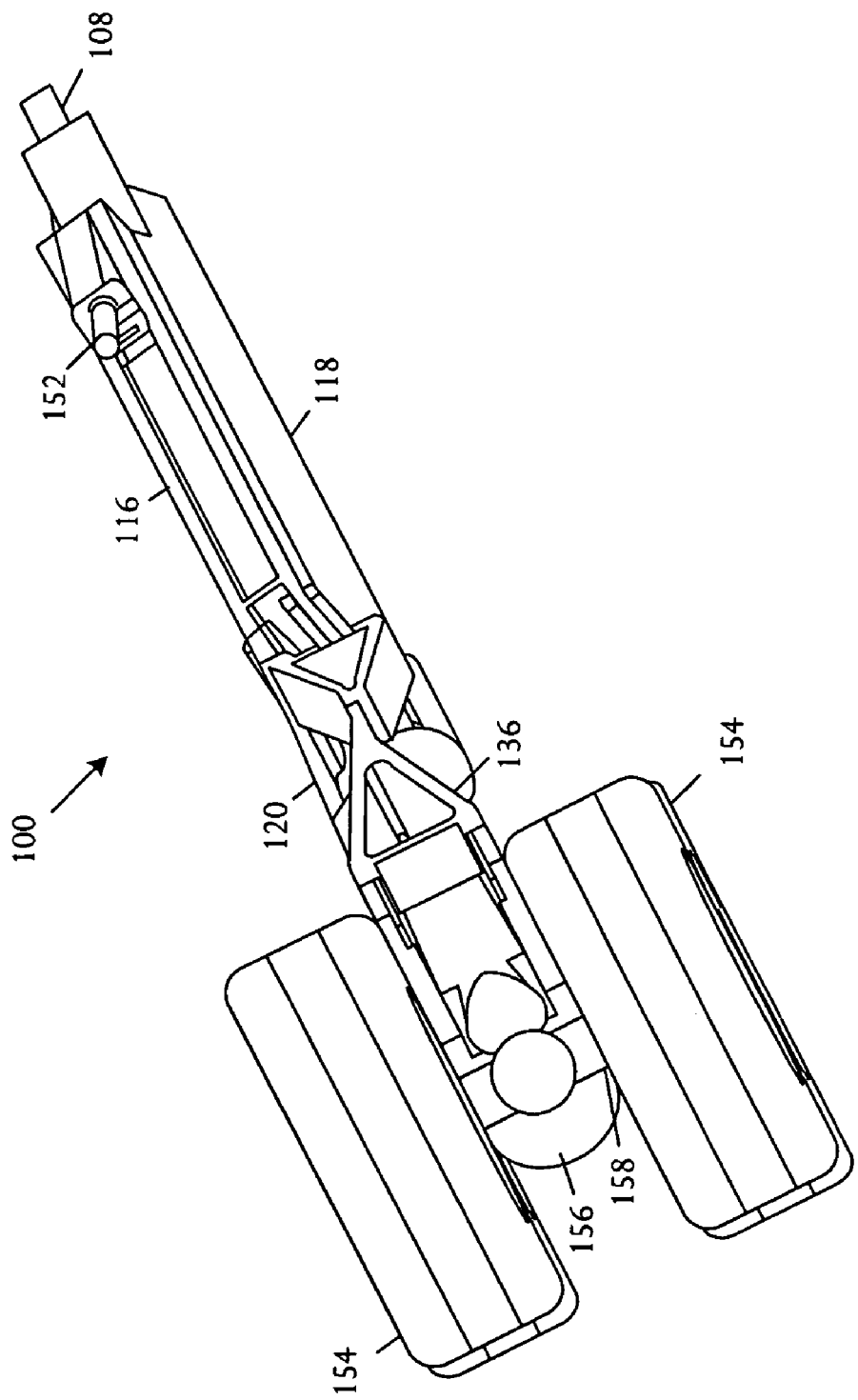
FIGS. 2A, 2B, and 2C are schematic pictorial diagrams that depict respective front, side, and plan views of a retracted main landing gear.
Figure 2B:
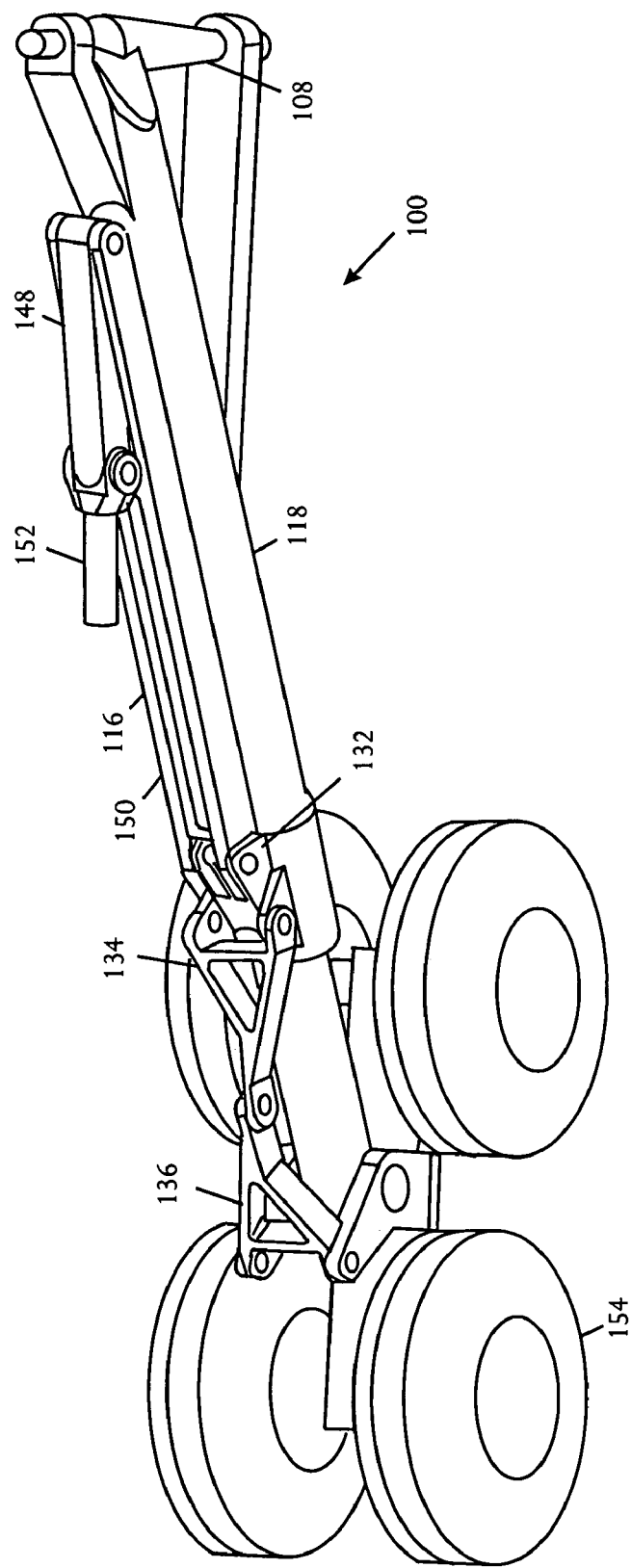
Figure 2C:
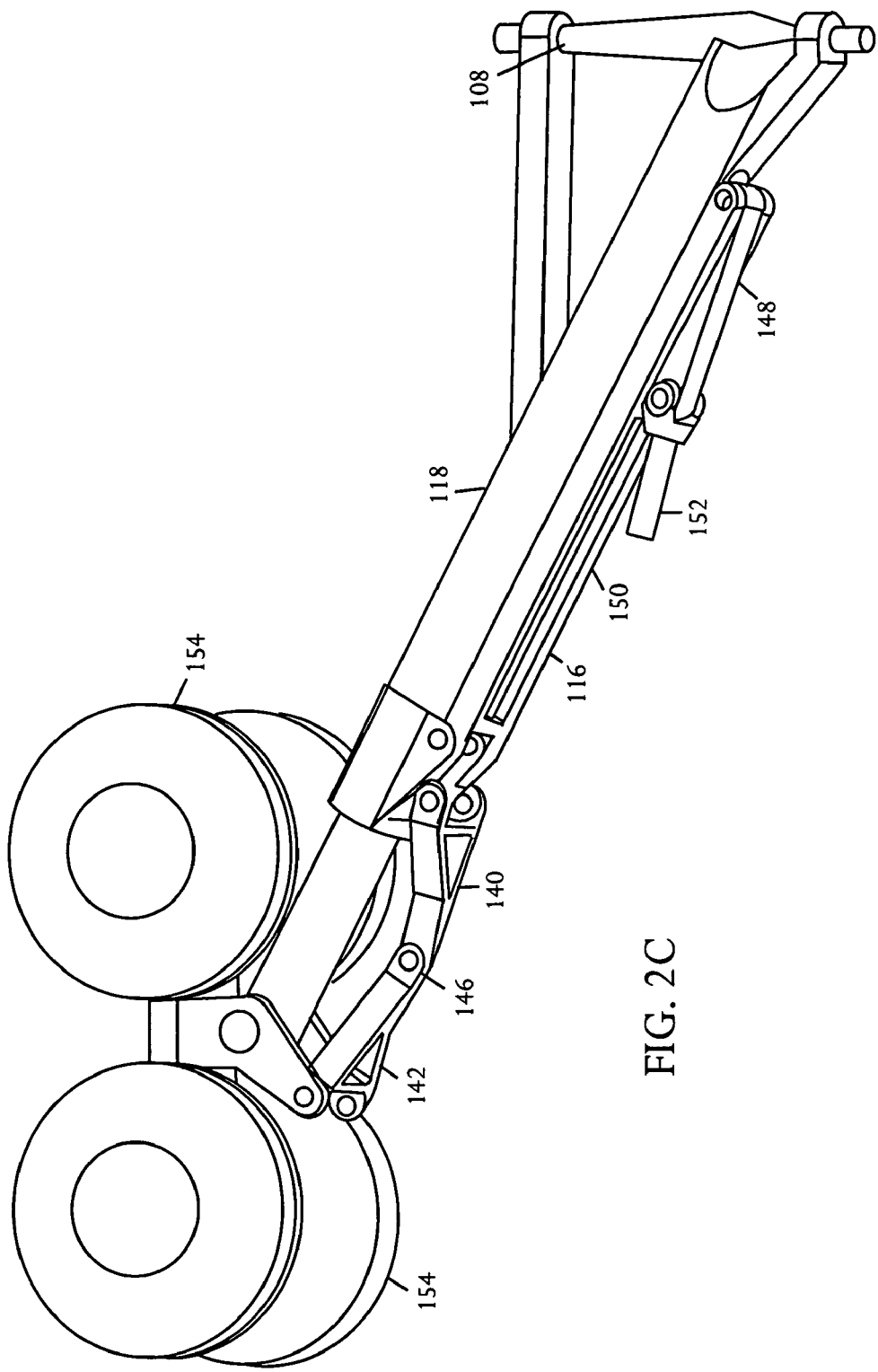

Referring to FIGS. 1A, 1B, and 1C, schematic pictorial diagrams show front, side, and top views of an extended main landing gear 100. FIGS. 2A, 2B, and 2C show respective front, side, and plan views of the main landing gear 100 when retracted. The illustrative main landing gear 100 comprises a four-wheel truck 110, a shock strut 112, a collar/scissor link assembly 114, and a drag strut assembly 116. The shock strut 112 is substantially straight; having no folding structures, shrink linkages, or hinges that would otherwise be used to shorten the strut upon retraction. By eliminating structures that shorten the strut on retraction, the main landing gear 100 minimizes or reduces the risk that the landing gear will fail to extend.

The shock strut 112 is a nonfolding, nonhinged structure, having a length that is essentially fixed throughout the retraction and extension cycle. The shock strut 112 further comprises collinear telescoping inner 120 and outer 118 cylinders, and lateral support arms 122 and 124. The inner shock strut cylinder 120 is axially slidable within the outer cylinder 118 with the proximal end of the inner cylinder 120 being inserted into the distal end of the outer cylinder 118. A shock absorber (not shown), for example an air-oil shock absorber, is contained within the telescoping inner 120 and outer 118 cylinders to dynamically cushion load conditions occurring during landing and other aircraft motion. The shock absorber commonly contains pressured gas, for example air, functioning as a spring or shock absorption medium. Hydraulic fluid, for example oil, is contained in a lower portion of the volume between the inner cylinder 120 and the outer cylinder 118.

The four-wheel truck 110 comprises four wheels 154, a truck beam 156 that supports a two axles 158 upon which the wheels 154 are mounted, two wheels 154 per axle 158. The four-wheel truck 110 is affixed to the shock strut 112 by a truck coupling 160 that pivotably attaches the truck beam 156 to an inner cylinder attachment collar 138 at the distal end of the inner shock strut cylinder 120. In an illustrative embodiment, the inner shock strut cylinder 120 has lateral sidepins 164 that insert into fitted apertures 166 in the inner cylinder attachment collar 138, permitting movement of the truck beam 156 about a truck axis 162. A truck actuator (not shown), for example a two-position actuator or other ancillary device, is coupled to the trick beam 156 and capable of pivoting the four-wheel truck 110 with respect to the shock strut 112.

The collar/scissor link assembly 114 has pivotable couplings to the inner shock strut cylinder 120 and the outer cylinder 118 that prevent rotation of the inner cylinder 120 with respect to the outer cylinder 118.

In some embodiments, the shock strut 112 is an air-oil shock strut that can contain one or more pistons (not shown) axially disposed within the strut cylinders. In some examples, a piston may comprise a nitrogen-oil oleo to compress and absorb the impact of landings. In various embodiments, the air-oil shock strut 112 may include any suitable shock absorber including pistons, hydraulic dampers, and the like that are capable of absorbing energy in normal, hard, and crash landings.

A trunnion 108 couples the main landing gear 100 to the aircraft. For a wing-mounted main landing gear assembly, the trunnion 108 can be attached to the aircraft's rear wing spar and landing gear beam with loads transmitted directly to primary wing-fuselage bulkheads. In other embodiments, the trunnion 108 can be attached to a mid-wing spar, rib, a fuselage bulkhead, or other appropriate structure. The shock strut 112 pivotably couples to the trunnion 108 via the lateral support arms 122 and 124, and a pivotable coupling 126 at the proximal end of the outer cylinder 118. Trunnion 108 connections to the pivotable coupling 126 and the lateral support arms 122 and 124 may be selected from among one or more of pins, axles, shafts, sockets, sleeves, and/or any other suitable devices that permit pivoting of devices, elements, or structures relative to one another with selected degrees of freedom. The lateral support arms 122 and 124 are affixed to the interior portion of the outer cylinder 118 and extend from the outer cylinder 118 to a canted trunnion axis 128. The trunnion axis 128 is canted in a configuration that causes the main landing gear 100 to retract forward and inboard into a main landing gear compartment in the aircraft fuselage. The trunnion axis 128 has an alignment that enables the main landing gear 100 to deploy and retract in a configuration that avoids lateral boundary encroachment of the two main landing gear 100 in the retracted position. The trunnion 108 can be coupled to a trunnion actuator (not shown) that rotates the trunnion 108 about the trunnion axis 128 when the gear is extended and retracted.

The collar/scissor link assembly 114 comprises an outer cylinder attachment collar 130 coupled to the distal end of the outer cylinder 118 and having a drag strut hinge 132 and a scissor-link hinge 134 for coupling to the drag strut assembly 116 and scissor-links 136, respectively. The collar/scissor link assembly 114 further comprises an inner cylinder attachment collar 138 coupled to the inner cylinder 120 in the vicinity of the distal end of the inner cylinder 120. The scissor-links 136 comprise an upper scissor link 140 that pivotably couples to the scissor-link hinge 134 and a lower scissor link 142 that pivotably couples to the inner cylinder attachment collar 138 at a lower scissor-link hinge 144. The upper 140 and lower 142 scissor links pivotably couple at a scissor hinge 146. Hinge pins form pivotable couplings of the upper 140 and lower 142 scissor links at the scissor-link hinges 134 and 144, and at the scissor hinge 146. The collar/scissor link assembly 114 firmly couples the inner 120 and outer 118 cylinders of the shock strut 112 while permitting relative axial motion of the cylinders in response to compression forces during landing and other aircraft motion.

The drag strut assembly 116 comprises an upper drag strut 148, a lower drag strut 150, and a drag strut attachment pin 152. A drag strut actuator (not shown) may be coupled to the drag strut attachment pin 152 to facilitate pivoting of the main landing gear 100 about the trunnion axis 128 during retraction and extension. The actuators may be hydraulic actuators, electric actuators, or any other suitable devices capable of moving the drag strut assembly 116 and pivoting the main landing gear 100 about the trunnion axis 128. The drag strut attachment pin 152 is coupled at the proximal end of the upper drag strut 148. In the illustrative embodiment, the upper drag strut 148 is a metal bar with a square or rectangular cross-section that pivotably couples to the lower drag strut 150 using a hinge pin. Illustratively, the lower drag strut 150 comprises a pair of solid metal side bars coupled by a plurality of cross members. The distal end of the upper drag strut 148 is inserted between the side bars at the proximal end of the lower drag strut 150 and pivotably coupled by a hinge pin. The distal end of the lower drag strut 150 is coupled to the drag strut hinge 132 using a hinge pin.

During retraction of the main landing gear 100, the drag strut actuator manipulates the drag strut assembly 116 to pivot the proximal end of the upper drag strut 148 downward, pushing the lower drag strut 150 toward the shock strut 112. The trunnion actuator drives the trunnion 108 to pivot about the trunnion axis 128, retracting the main landing gear 100 forward and inboard toward the aircraft fuselage about the canted trunnion axis 128. In various embodiments, the trunnion actuator may actuate hydraulically, pneumatically, electrically, and/or in any other suitable manner to retract and/or extend the main landing gear 100. The trunnion actuator and the drag strut actuator operate in concert to rotate the geometry of the drag strut assembly 116 and collar/scissor link assembly 114 to rotate the four-wheel truck 110 about a shock strut axis 106 during a retract cycle. The geometric rotation causes the four-wheel truck 110 to be aligned fore and aft in the fuselage when stowed. The truck actuator rotates the four-wheel truck 110 about the truck pivot axis 162 approximately 45° during the retraction cycle. The truck actuator maintains the four-wheel truck 110 approximately level from fore to aft throughout the retraction cycle to reduce drag.

Accordingly the main landing gear 100 retracts in a forward and inboard direction, enabling the main landing gear 100 to be stowed for forward within the fuselage than a purely inward retracting geometry. The combined forward and inboard retraction enables compact storage in the lateral dimension and avoids interference of paired landing gear on opposing sides of the aircraft, enabling usage of a longer strut without requiring shortening mechanisms such as shrink linkages, folding components, hinges, or compression devices that can fail. Eliminating usage of points of failure, reduces complexity and cost, and minimizes or reduces the possibility of the landing gear failing to extend or to break. When fully retracted, the landing gear fits within contours of the aircraft wing at an angle that matches the aircraft wing dihedral and the four-wheel truck 110 supported on the side by the landing gear door, oriented approximately fore and aft.

When the main landing gear 100 is extended, the actuators function in a converse manner with the shock strut 112 pivoting downward and back about the trunnion axis 128. The forward-retracting geometry assists gear extension by utilizing the weight and mass of the main landing gear 100 and wind or air load to aid in extension of the main landing gear 100, facilitating gear deployment in emergency situations. Weight of the four-wheel truck 110 and operation of the actuators drive the main landing gear 100 into the fully-extended configuration. As in retraction, the truck actuator maintains the four-wheel truck 110 approximately level fore-to-aft to reduce drag.

Referring to FIGS. 3A, 3B, 3C, and 3D, a sequence of pictorial diagrams show the sweep of the main landing gear 100 in transition from an extended configuration to a retracted configuration. FIG. 3A shows the main landing gear 100 extended with the four-wheel truck 110 in contact with the ground, the drag strut assembly 116 straightened, and the collar/scissor link assembly 114 in a relatively closed angle.

FIG. 3B shows the main landing gear 100 in a position of early retraction with the shock strut axis 106 partially pivoted forward about the trunnion axis 128. The collar/scissor link assembly 114 opens to a larger angle and the drag strut assembly 116 bends at the drag strut hinge 132. The four-wheel truck 110 pivots forward to maintain an essentially level plane to reduce drag.

In FIG. 3C the main landing gear 100 is retracted further and the shock strut 112 remains straight but angles further forward and inboard. The collar/scissor link assembly 114 further widens to a still larger angle. The drag strut assembly 116 bends to a smaller angle at the drag strut hinge 132. The drag strut attachment pin 152 is rotated about an axis of rotation to facilitate forward and inboard motion of the main landing gear 100. The four-wheel truck 110 is pivoted forward an additional amount to maintain an essentially level plane to reduce drag.

In FIG. 3D, the main landing gear 100 is fully retracted and contained within wing contours 310 at an angle that matches the wind dihedral. The shock strut 112 remains essentially at the same length throughout the retraction cycle to simplify the gear structure and avoid usage of shortening mechanisms, minimizing or reducing the risk that the landing gear will fail to extend. The only changes in shock strut length are incident to the shock absorption capability of the strut.

Contrary to retraction in the forward direction, rearward extension facilitates extension. Rearward wind loads and weight of the four-wheel truck 110 create a load path that gravitationally extends the main landing gear 100 in emergency conditions.

Referring to FIGS. 4A and 4B, schematic pictorial diagrams respectively depict side views of an example of an aircraft 400 that includes the main landing gear 100, and the landing gear 100 shown separately. The landing gear 100 has actuators including a trunnion actuator 412, a drag strut actuator 410, and a truck actuator 414. In some examples, an actuator, here shown as trunnion actuator 412, can comprise a chamber 420 and a piston 422. The chamber 420 can actuate the piston 422 in some manner, for example electrically, pneumatically, hydraulically, or otherwise to extend or contract the piston 422, for example, moving the drag strut over center. A drag strut actuator 410 is coupled to the drag strut and is capable of applying a lifting moment to the landing gear 100. In the illustrative example, the truck actuator 414 can be a linkage driven off motion of the main gear 100. The actuators can be coupled to various structures using suitable couplers including pins, hinges, shafts, axles, apertures, sleeves, sockets, and the like. Actuators can be constructed or composed of any suitable materials.

The aircraft 400 comprises an airframe 402 or fuselage, wings 404, engines 408 attached to the wings 404, tail 409, and a front landing gear 406, in combination with two main landing gear assemblies 100. A first main landing gear 100 is shown and the first gear hides a second main landing gear, a mirror image of the first on the opposing side of the aircraft 400. The front landing gear 406 and two main landing gear 100 support the airframe 402 when the aircraft 400 is landing, taxiing, or standing. The landing gear are stowed in landing gear compartments. For example a main landing gear 100 is stowed in a main landing gear compartment.

The front landing gear 406 and the paired main landing gear 100 are located at a selected distance from the aircraft center of gravity 432 in both lateral and longitudinal directions to reduce the possibility of the aircraft 400 tipping back or over in turbulent or stressful conditions. Gear locations are selected for stability over the range of possible center of gravity locations that occur for appropriate loading conditions.

Figure 4C:
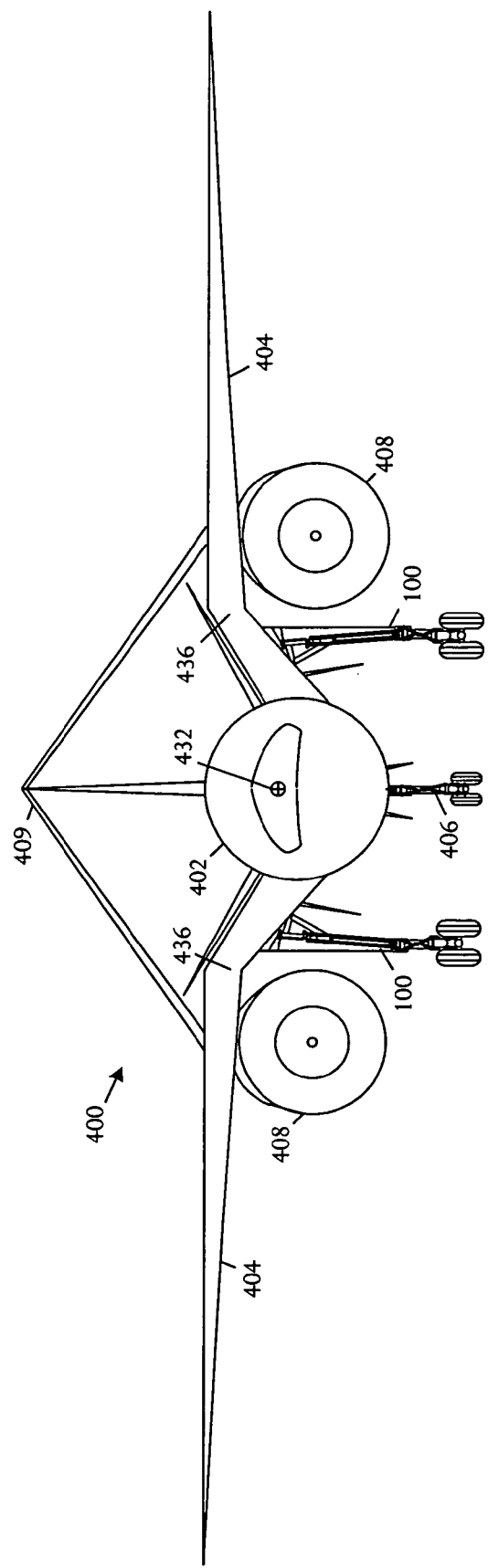
FIG. 4C is a schematic pictorial diagram that depicts a frontal view of the aircraft with the main landing gear extended.
Figure 4D:
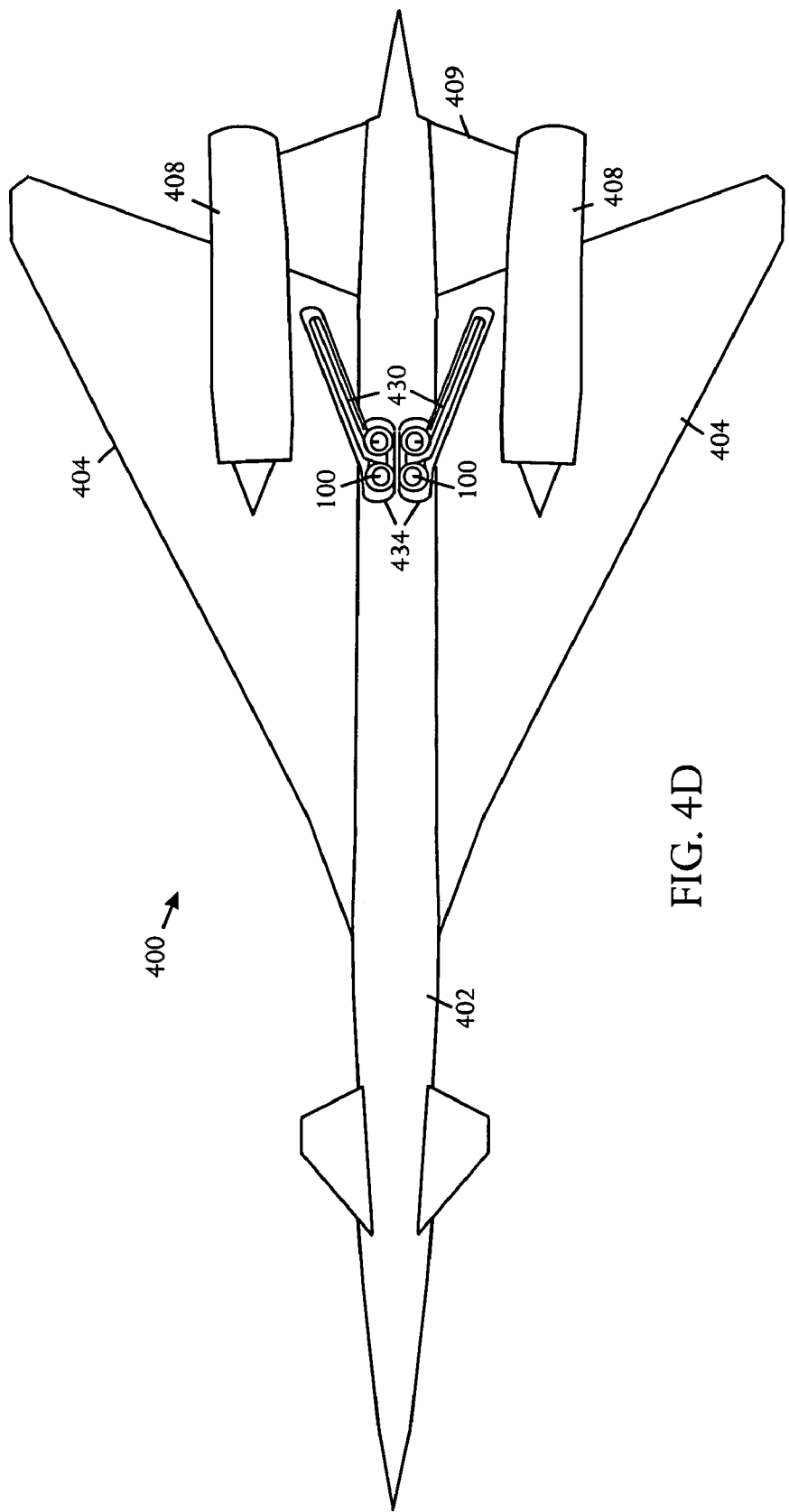
FIG. 4D is a schematic pictorial diagram showing a bottom view of the aircraft.

Referring to FIG. 4C, a schematic pictorial diagram depicts a frontal view of the aircraft 400 with the main landing gear 100 extended. FIG. 4D is a schematic pictorial diagram showing a bottom view of the aircraft 400. The main landing gear 100 is located forward and inboard of the engines 408. The described main landing gear 100 and integration of the landing gear configuration within the aircraft structure facilitate ground stability. In the illustrative embodiment, the aircraft 400 has a structure that increases stability by increasing tail scrape angle and widening the wheel base. The tail scrape angle is increased by lowering the fuselage 402 and raising the engines 408, for example by virtue of a gull 436 in the wing 404 that relatively raises the engine 408.

The retracted main landing gear 100 fits into the wing 404 at an angle that matches the wing dihedral, the upward angle of the wing 404 from vertical as seen from the frontal view of the aircraft 400. Wing dihedral increases the aerodynamic stability of the aircraft 400 and benefits engine/wing iteration to reduce drag. In some embodiments, the wing 404 includes Krueger flaps (not shown) and the leading edge of the wing 404 extends in an essentially straight line to facilitate using a simple hinge line that accommodates the Krueger flaps. Some embodiments have a wing 404 with reduced leading and trailing edge sweeps.

The wheels of the four-wheel truck 110 are aligned fore and aft in the fuselage 402 to reduce or minimize cross-sectional volume and compactly stored in a wheel well 434. The main landing gear geometry integrates into the inboard wing dihedral of the aircraft 400 and has a size that fits into a compact fuselage volume by virtue of the forward and inboard retraction. The main landing gear geometry also conforms to available load paths of the aircraft structure to react to landing gear loads.

The main landing gear 100 have sufficient length to supply ground clearance between the engines 408, aft-body of the airframe 402, wingtips, and engine nacelles with respect to the runway or static ground line. To reduce or minimize the risk that the landing gear will fail to extend, the tall main landing gear 100 omits shortening mechanisms including folding and hinge structures. The aircraft accommodates the tall main landing gear 100 by retracting the gear forward and inboard into the main landing gear compartments 430 that similarly angle in a forward and inboard direction.

In some embodiments, the inboard portion of the wing 404 is configured to integrate with the nacelle and a diverter formed between the nacelle and the wing 404 to follow the contour of a low-sonic-boom fuselage 402 with as close a normal intersection as possible to attain low interference drag. In some embodiments, an inboard flap hinge line is fully contained within the wing contour with the wing 404 upper and lower surfaces held as planar as possible to facilitate seal design.

With the resulting wing configuration, the wing gull raises the engines 408 to increase available tip back angle and reduce thrust-induced pitching moments. The gull enhances low-boom signature by vertically staggering the wing longitudinal lift distribution and lowers the aircraft body or fuselage 402 to reduce the height of the cabin door above the ground, thereby reducing entry stair length. The low fuselage 402 assists in maintaining a low aircraft center of gravity, reducing tip over angle and promoting ground stability. The wing gull forms a wrapping of the wing 404 around the nacelle that enhances favorable interference between the inlets and the wing 404, resulting in a wing/body/nacelle geometry conducive to successful ditching and gear-up landings.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the invention. Variations and modifications of the embodiments disclosed herein may be made based on the description set forth herein, without departing from the scope and spirit of the invention as set forth in the following claims.

For example, although the illustrative embodiment depicts a landing gear with a four-wheel truck, other embodiments may utilize a truck with other numbers of wheels, such as a two-wheel truck, a six-wheeled truck, or other sizes, depending on the weight and size of the aircraft utilizing the landing gear. Furthermore, the illustrative embodiment shows a particular actuator configuration and linkages to an aircraft. Other embodiments may utilize other types of actuators, more or fewer linkages to an aircraft, and other locations and types of linkages to the aircraft.

What is claimed is:

1. An aircraft landing gear movable between a retracted position and all extended position and comprising:
   a nonfolding, nonhinged shock strut that extends along a shock strut axis from a proximal end to a distal end and remains at an essentially constant length throughout an extension/retraction cycle;
   a trunnion coupled to the proximal end of the shock strut and adapted to pivot in combination with the shock strut about a canted trunnion axis enabling the shock strut to retract in a forward and inboard direction and extend downward and outboard;
   a multiple-wheel truck coupled to the distal end of the shock strut configured for geometric rotation on retraction aligning the multiple-wheel truck fore and aft in an aircraft fuselage; and
   a drag strut coupled to the shock strut at a position intermediate to the shock strut proximal and distal ends, the drag strut being adapted to fold as the landing gear is retracted and straightening as the landing gear is extended.

2. The aircraft landing gear according to claim 1 further comprising:
   a telescoping, collinear inner cylinder and outer cylinder forming a strut axis of the shock strut; and
   a collar/scissor link assembly flexibly coupling the inner cylinder and the outer cylinder so that the shock strut can compress and extend to absorb impact forces.

3. The aircraft landing gear according to claim 1 further comprising:
   a coupling between the shock strut, the drag strut, and the truck that rotates the truck about the shock strut axis, maintaining the truck approximately level from fore to aft during a retraction cycle.

4. The aircraft landing gear according to claim 1 further comprising:
   an actuator that rotates the truck about a truck pivot axis gradually so that the truck is held approximately level during a retraction cycle.

5. The aircraft landing gear according to claim 1 wherein:
   the truck has multiple axles and two wheels per axle and is coupled to the shock strut by a pivotable linkage.

6. An aircraft landing gear apparatus for an aircraft including a fuselage extending fore and aft and wings attached at an inboard location to the fuselage, the landing gear apparatus comprising:
   a landing gear storage compartment formed within the wing, beginning at a landing gear linkage and extending forward and inboard to a wheel well within the fuselage;
   a landing gear movable between a retracted position and an extended position and comprising:
      a nonfolding, nonhinged shock strut coupled to the landing gear linkage at a proximal end and extending along a shock strut axis from the proximal end to a distal end, the shock strut having an essentially constant length throughout an extension/retraction cycle; and
      a multiple-wheel truck coupled to the distal end of the shock strut;
      the landing gear having a structure that drives the shock strut distal end and the truck in a forward and inboard direction during retraction, stowing the multiple-wheel truck in the fuselage wheel well.

7. The aircraft landing gear apparatus according to claim 6 wherein:
   the landing gear deploys so that the shock strut distal end and the truck move in a rearward and outboard direction.

8. The aircraft landing gear apparatus according to claim 6 wherein:
   the landing gear retracts to an angle that follows wing contours of an inboard wing dihedral, the shock strut fitting within local wing contours and the multiple-wheel truck being stored in the fuselage wheel well.

9. The aircraft landing gear apparatus according to claim 6 further comprising:

a trunnion coupled to the proximal end of the shock strut and adapted to pivot in combination with the shock strut about a canted trunnion axis.

10. The aircraft landing gear apparatus according to claim 6 further comprising:
a drag strut coupled to the shock strut at a position intermediate to the shock strut proximal and distal ends, the drag strut being adapted to fold as the landing gear is retracted and straightening as the landing gear is extended,
the canted trunnion axis being canted so that the shock strut retracts in a forward and inboard direction and extends downward and outboard.

11. The aircraft landing gear apparatus according to claim 6 further comprising:
a telescoping, collinear inner cylinder and outer cylinder forming a strut axis of the shock strut; and
a collar/scissor link assembly flexibly coupling the inner cylinder and the outer cylinder so that the shock strut can compress and extend to absorb impact forces.

12. The aircraft landing gear apparatus according to claim 6 further comprising;
a coupling between the shock strut, the drag strut, and the truck that rotates the truck about the shock strut axis, maintaining the truck approximately level from forc to aft during a retraction cycle.

13. The aircraft landing gear apparatus according to claim 6 further comprising:
an actuator that rotates the truck about a truck pivot axis gradually so that the truck is held approximately level during a retraction cycle.

14. The aircraft landing gear apparatus according to claim 6 wherein:
the truck has multiple axles and two wheels per axle and is coupled to the shock strut by a pivotable linkage.

15. An aircraft comprising:
a fuselage;
paired wings coupled to opposing sides of the fuselage;
at least two engines mounted on the paired wings symmetrically with respect to the fuselage;
paired landing gear storage compartments respectively formed under the paired wings forward and inward toward the fuselage from the engines, each beginning at a landing gear linkage and extending forward an inboard to a wheel well within the fuselage;
paired landing gear each movable between a retracted position and an extended position and comprising:
a nonfolding, nonhinged shock strut coupled to the landing gear linkage at a proximal end and extending along a shock strut axis from the proximal end to a distal end, the shock strut having an essentially constant length throughout an extension/retraction cycle; and
a multiple-wheel truck coupled to the distal end of the shock strut;
the landing gear having a geometry that angles the shock strut distal end and the truck in a forward and inward direction during retraction, stowing the multiple-wheel truck in the fuselage wheel well.

16. The aircraft according to claim 15 wherein;
the landing gear deploys so that the shock strut distal end and the truck move in a rearward and outward direction.

17. The aircraft according to claim 15 wherein:
the landing gear retracts to an angle that follows wing contours of an inward wing dihedral, the shock strut fitting within local wing contours and the multiple-wheel truck being stored in the fuselage wheel well.

18. The aircraft according to claim 15 further comprising:
a trunnion coupled to the proximal end of the shock strut and adapted to pivot in combination with the shock strut about a canted trunnion axis.

19. The aircraft according to claim 15 further comprising:
a drag strut coupled to the shock strut at a position intermediate to the shock strut proximal and distal ends, the drag strut being adapted to fold as the landing gear is retracted and straightening as the landing gear is extended,
the canted trunnion axis being canted so that the shock strut retracts in a forward and inboard direction and extends downward and outward.

20. The aircraft according to claim 15 further comprising:
a telescoping, collinear inner cylinder and outer cylinder forming a strut axis of the shock strut; and
a collar/scissor link assembly flexibly coupling the inner cylinder and the outer cylinder so that the shock strut can compress and extend to absorb impact forces.

21. The aircraft according to claim 15 further comprising:
a coupling between the shock strut, the drag strut, and the truck that rotates the truck about the shock strut axis during a retraction cycle.

22. The aircraft according to claim 15 further comprising:
an actuator that rotates the truck about a truck pivot axis gradually so that the truck is held approximately level during a retraction cycle.

23. The aircraft according to claim 15 wherein:
the truck has multiple axles and two wheels per axle and is coupled to the shock strut by a pivotable linkage.

24. An aircraft comprising:
a fuselage;
paired wings coupled to opposing sides of the fuselage and having a leading edge and a trailing edge;
at least two engines mounted on the paired wings symmetrically with respect to the fuselage, the wings incorporating a substantial dihedral inboard toward the fuselage from the engines, the dihedral being most pronounced at the wing trailing edge;
paired landing gear storage compartments respectively formed within the paired wings and extending forward and inboard toward and interior to the fuselage from the engines;
paired landing gear each comprising a nonfolding, nonhinged shock strut and a multiple wheel truck coupled to the shock strut arranged in a geometry so that the landing gear retract forward and inward into the landing gear storage compartment with the multiple wheel truck being stowed in the compartment in a fore and aft arrangement.

25. The aircraft according to claim 24 wherein:
the dihedral is formed by twisting or cambering the wing for low sonic boom and low induced drag while preserving a tailored local wing contour where the landing gear retracts.

* * * * *